Figure 1:
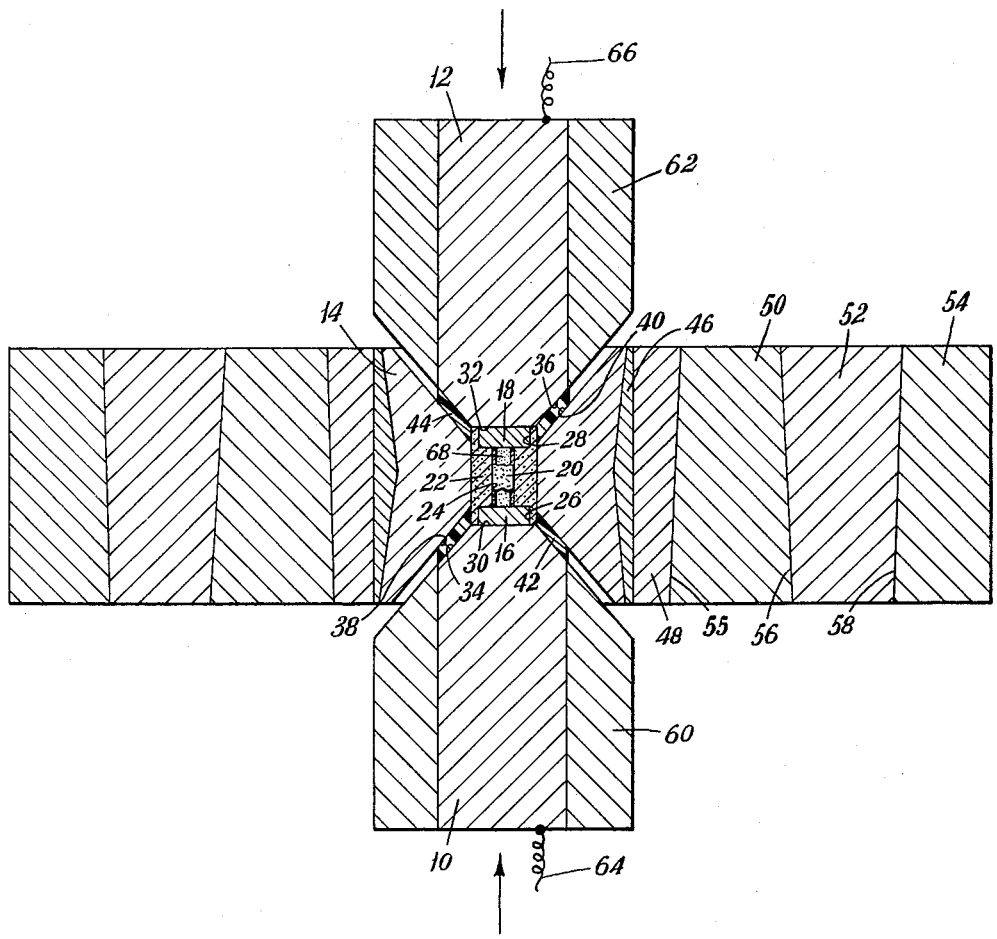

June 23, 1964 W. B. DANIELS 3,137,896
APPARATUS FOR SUBJECTING MATTER TO ULTRA-HIGH PRESSURE
Filed Sept. 27, 1961 2 Sheets-Sheet 1

INVENTOR.
WILLIAM B. DANIELS
BY
ATTORNEY

June 23, 1964 W. B. DANIELS 3,137,896
APPARATUS FOR SUBJECTING MATTER TO ULTRA-HIGH PRESSURE
Filed Sept. 27, 1961 2 Sheets-Sheet 2

INVENTOR.
WILLIAM B. DANIELS
BY
ATTORNEY

United States Patent Office 3,137,896
Patented June 23, 1964

3,137,896
APPARATUS FOR SUBJECTING MATTER TO ULTRA-HIGH PRESSURE
William B. Daniels, Princeton, N.J., assignor to Union Carbide Corporation, a corporation of New York
Filed Sept. 27, 1961, Ser. No. 141,114
20 Claims. (Cl. 18—16.5)

This invention relates to an ultra-high pressure, high temperature apparatus. More particularly, it concerns improved means for subjecting specimens to ultra-high pressures and high temperatures simultaneously.

High pressure dies and other ultra-high pressure, high temperature apparatus are a comparatively recent development. Reliable and durable apparatus is increasingly being called for in studies covering such areas as crystal growths, phase transitions, solid state problems, and mineral syntheses.

The prior art teaches design concepts for withstanding extremely high loads by utilizing costly, heavy and massive type structures to support the apparatus. These designs are built around a hydraulic press which actuates specially shaped opposing rams. These rams are free to converge towards one another while within a female die of compatible form thereby forming a core region. The female die is commonly surrounded by a series of supporting rings in an attempt to withstand the lateral loads that are generated. It is within this core region where the test specimens are located and subjected to ultra-high pressure and high temperature.

Unfortunately, numerous and consistent fractures in the rams, die and/or supporting rings are encountered in this type apparatus which severely limits the useful life of the apparatus. The short life is due to the inherently large stresses and strains caused by exceedingly high pressures developed in the apparatus. Another factor which contributes to the ultimate failure of this type apparatus is the non-uniform distribution of stresses in the core region which result in localized high stress areas which cause multiple cracks and fractures.

It is an object of the invention to provide an apparatus for subjecting specimens simultaneously to ultra-high pressures and high temperatures; such apparatus avoiding the inherent disadvantages of the prior art apparatus discussed above.

Another object of the present invention is to provide a durable apparatus which is capable of imparting to a test specimen positioned therein a pressure of at least 100,000 atmospheres and a temperature of at least 3000° C. for a period of at least one hour.

Broadly stated the objects of the invention are accomplished by a pair of coacting frustoconical opposed male rams and compatibly shaped female die apparatus which forms a core region for retention of a test specimen to be subjected simultaneously to ultra-high pressures and high temperatures wherein means are provided for evenly distributing the generated stresses in the core region.

More specifically, the means comprise non-yieldable metal decompression caps interposed between the opposed rams and the test specimen, and yieldable plastic consolidation gaskets interposed between the mating surfaces of the opposed male rams and the female die. In the preferred embodiment, further means are provided which furnish the female die with a desirable hyperboloidal prestressed shape and additionally, stress redistributing means are provided for the male rams and their supporting structures.

It will be appreciated by those skilled in the art that the features of the invention are not strictly limited to an apparatus wherein two opposing male rams converge within a stationary female die but are adaptable to an apparatus wherein only one of the rams is movable and even to an apparatus wherein the female die is replaced by two more converging dies, all the dies thus converging to form the core region.

Figure 2:
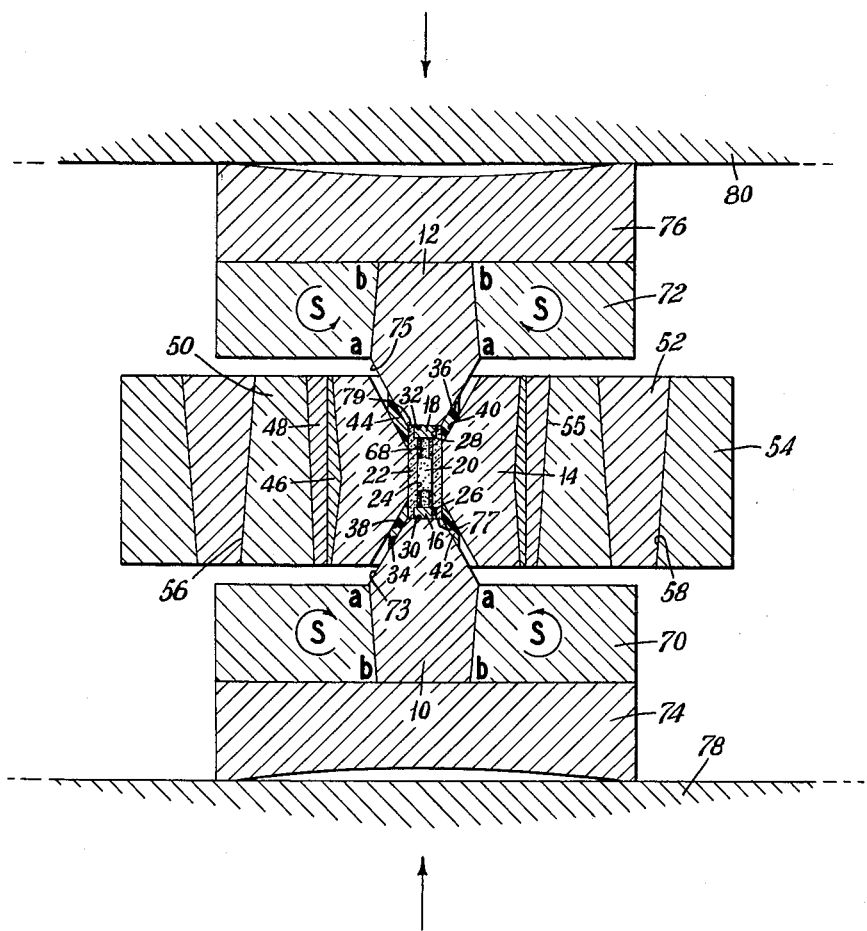

The invention will be more readily understood by reference to the accompanying drawing wherein:

FIG. 1 is a sectional view of an apparatus which embodies the principles of the invention; and FIG. 2 is a sectional view of an apparatus similar to the apparatus of FIG. 1 showing modified ram supporting means.

Referring now to the drawing and particularly to FIG. 1, there is shown a vertical acting device comprising a pair of opposed frustoconical male rams preferably made of cemented tungsten carbide. More specifically, the rams consist of a lower ram 10 and an upper ram 12 either or both of which may be activated in a converging direction within a compatibly shaped female die 14, also preferably of cemented tungsten carbide. The rams 10 and 12 and the die 14 thereby form a cylindrical core region. Within this region are positioned two hard metal replaceable decompression caps 16 and 18, preferably made of steel and between said decompression caps 16 and 18 is a sample retainer member 20, of an electrically conductive material. The decompression caps 16 and 18 and the sample retainer member 20 are held in place by a pressure transmitting cylindrical member 22. The cylindrical member 22 is provided with a bored out central axial aperture 24 and opposing counterbored holes 26 and 28 located in the faces 30 and 32 of the cylindrical member 22 in order to accommodate the caps 16 and 18 and the retainer member 20. The conical surfaces 34 and 36 of the rams 10 and 12 respectively are separated from the corresponding conical surfaces 38 and 40 of the die 14 by yieldable plastic consolidation gaskets 42 and 44.

Surrounding the female die is a bevel-shaped annulus 46. This bevel shaped annulus is preferably made of steel and acts to give a desirable hyperboloidal prestressed shape to the female die 14. This could also be accomplished by precision grinding of the adjacent face of a shim ring 48 which circumscribes the annulus 46. This shim ring 48 is preferably split into four pieces for ease of removal of a broken or fractured die. Surrounding and juxtaposed this shim ring 48 is an inner annular binding ring 50. Likewise around the inner binding ring 40 is an outer annular binding ring 52. Surrounding the outer binding ring 52 is a protective safety ring 54 which will retain any fragments that break away from the inner rings under high stress loads. The binding rings 50 and 52 are preferably tapered on surfaces 55, 56 and 58 as shown in FIG. 1 so as to create a prestressed wedge-like assembly. In the preferred embodiment, the rings 50, 52 and 54 are all made of steel.

Surrounding and supporting the lower and upper rams 10 and 12 respectively in FIG. 1 are ram supports 60 and 62. Additional support is provided for the rams 10 and 12 by the previously mentioned consolidation gaskets 42 and 44.

Electrical leads 64 and 66 provide current to the rams 10 and 12 and thereby to the metal decompression caps 16 and 18 and the sample retainer member 20, thus heating the test specimen 68 located within the retainer member 20.

A modified method of supporting the rams 10 and 12 is shown in FIG. 2. In this embodiment, the ram supports 60 and 62 of FIG. 1 are replaced by ram support rings 70 and 72, saucer-shaped back-up blocks 74 and 76 and press platens 78 and 80. The saucer-shaped backup blocks 74 and 76 will deform as the ram load is increased by a hydraulic press (not shown) bearing against the press platens 78 and 80. By this design, the ram support rings 70 and 72 will rotate in the direction of the arrows. This deformation will be opposed by a shift of the radial stress S, increasing S near the region *a*, at the expense of the stress at *b*. This redistributed stress will lessen the chances of ram failure by producing a compensating stress pattern on the slightly tapered, cylindrical ram surfaces 73 and 75 that equalizes in detail the transmitted forces due to pressure on the flat ram faces 77 and 79 in the sample chamber. A geometrical advantage is to be gained by use of the support rings 70 and 72 since they will provide maximum radial support effectively only along a fraction of their axial length.

In the operation of both embodiments of the ultra-high pressure, high temperature apparatus described herein, pressure is generated by advancing the rams 10 and 12 into the female die 14, suitably with a hydraulic press (not shown), thereby compressing the contents 68 of the sample retainer member 20 while compressing and extruding the consolidation gasket 42 and 44. The action of the gaskets 42 and 44 can be described as one of consolidating the otherwise unsupported portion of the pressure transmitting cylinder 22 during its collapse as the load is appliedg. Without the consolidation gaskets 42 and 44, the cylinder 22 would crumble and spread out into a very thin layer which would permit only very little relative motion of the rams 10 and 12 and consequently very little transmission of pressure to the test sample. With the use of the consolidation gaskets 42 and 44, only a slight latent extrusion of the cylindrical member 22 takes place and by proper choice of the overall length of the pressure transmitting cylinder 22 with respect to the core region, a thick, easily compressible gasket of the material of cylinder member 22 forms during early stages of the compression. In effect, the consolidation gaskets 42 and 44 establish a desirable pressure gradient along the conical surfaces 34 and 36 of the core region formed by the rams 10 and 12, and the die 14. This pressure gradient eliminates any sharp stress discontinuity or any localized ultra-high stressed areas in the core region.

In the preferred embodiment, the cylindrical member 22 is fabricated from pyrophyllite and the compression gaskets 42 and 44 are fabricated from a deformable plastic such as extrudable polyethylene or a tetrafluoroethylene polymer such as that available under the trademark "Teflon."

The function of the decompression caps 16 and 18 which are preferably made of steel is to increase the average bulk modulus of the core region relative to the average bulk modulus of the consolidation gaskets 42 and 44. When the rams 10 and 12 are advanced towards each other and if there is no extrusion of the gaskets 42 and 44, and the shear strength of the pressure transmitting member 22 is small compared to the average pressures generated, there will be a pressure rise in the core region and a pressure rise in the gaskets 42 and 44. If a higher pressure rise is generated in the core region relative to the gaskets 42 and 44, then this will result in severe extrusion or a blow out of the gaskets 42 and 44. If a lower pressure rise occurs in the core region relative to the gaskets 42 and 44, then the stresser on the structural members of the apparatus will be exceedingly large thereby causing fractures thereof and consequently the core region will not develop any substantial pressure rise. Therefore, the ideal condition desired occurs when the pressure rise in the core region is approximately equal to the pressure rise in the gaskets 42 and 44. It is inherent in apparatus of this type that the pressure rise in the gasket region is much higher than that of the core region if the core region is empty or contains predominantly compressible matter. Therefore, by using the decompression caps 16 and 18 and consolidation gaskets 42 and 44 described herein, the ideal condition is approached and the pressure rises in the critical regions are about equal since the pressure rises are directly proportional to their respective average bulk moduli. Specifically, the decompression caps 16 and 18 increase the bulk modulus of the core region relative to the bulk modulus of the gaskets 42 and 44 in order to increase the pressure rise in the core region relative to the pressure rise in the gaskets 42 and 44. Furthermore, the extrusion of the gaskets 42 and 44 also aid in approaching the ideal condition by reducing the pressure rise in the gaskets 42 and 44 thus making the pressure rise more nearly uniform. Actual tests show that these unique members reduce the press load required to reach the Bi I→II transition by about 50%.

In addition, the decompression caps 16 and 18 distribute the current over a large ram area when using electrical heating by conduction thus reducing the probability of local overheating and ultimate fracture. No noticeable early ram failures have resulted from the absence of a non-metallic thermal insulation between the high-temperature zone and the die ends of the rams.

The initial pressure calibration for the apparatus may be made by the standard procedure of observing the well defined sharp changes in electrical resistances during polymorphic transitions at fixed pressures with bismuth and barium enclosed within a retainer member made from silver chloride. During a given run the pressures are recorded and the temperatures are calculated from power consumption. These pressure and temperature readings are then available for recording the conditions to which any given specimen was subjected.

Summarizing, the unique features of the apparatus described herein have made the stresses in the critical core region more nearly uniform when the system is at ultra-high pressure while providing longer life for an ultra-high pressure, high temperature apparatus. Consequently the structure need not be as heavy and massive as otherwise would be required, giving corresponding lower costs of construction, ease of maintenance and repeated reliability in operation over sustained periods of time while under ultra-high pressures and very high temperatures. Several mineral syntheses including among them coesite, almandite and diamond have been successfully carried out in the described apparatus.

I claim:

1. In an apparatus capable of exerting a pressure of at least 100,000 atmospheres on a test specimen and simultaneously heating it to at least a temperature of 3000° C.; said apparatus comprising opposed frustoconical male rams which are free to converge within a compatibly shaped female die thereby forming a cylindrical core region for retention of said test specimen; the improvement which comprises a replaceable hard metal decompression cap located between each of said rams and said test specimen.

2. In an apparatus capable of exerting a pressure of at least 100,000 atmospheres on a test specimen and simultaneously heating it to at least a temperature of 3000° C.; said apparatus comprising a plurality of opposed frustoconical rams which are free to converge thereby forming a core region for retention of said test specimen, the improvement which comprises consolidation gaskets of yieldable plastic material chosen from the group consisting of extendable polyethylene and a tetrafluoroethylene polymer located between the mating surfaces of said rams and replaceable hard metal decompression caps disposed in said core region between said rams and said test specimen.

3. In an apparatus capable of exerting a pressure of at least 100,000 atmospheres on a test specimen and simultaneously heating it to at least a temperature of 3000° C.; said apparatus comprising opposed frustoconical male rams which are free to converge within a compatibly shaped female die thereby forming a cylindrical core region for retention of said test specimen, the improvement which comprises a consolidation gasket of yieldable plastic material chosen from the group consisting of extrudable polyethylene and a tetrafluoroethylene polymer located between the mating surfaces of each of said male rams and said female die and a replaceable hard metal decompression cap disposed between each of said rams and said test specimen.

4. An apparatus capable of exerting a pressure of at least 100,000 atmospheres on a test specimen and simultaneously heating it to at least a temperature of 3000° C. for periods in excess of one hour; which comprises opposed frustoconical male rams of cemented tungsten carbide which are free to converge within a compatibly shaped female die of cemented tungsten carbide thereby forming a cylindrical core region, said core region containing a replaceable steel decompression cap in juxtaposition with each of said opposing male rams, said caps supporting therebetween an electrically conductive test specimen retainer member, said retainer member and said decompression caps being surrounded with a pressure transmitting cylindrical member of pyrophyllite; the conical surfaces of said opposing male rams and said female die being separated by consolidation gaskets of yieldable plastic material chosen from the group consisting of extrudable polyethylene and a tetrafluoroethylene polymer.

5. The apparatus of claim 4 wherein said female die is surrounded by a prestressed wedge-like assembly which comprises a bevel shaped annulus in juxtaposition with said female die, said annulus being circumscribed in succession by a split shim ring, an inner annular binding ring, an outer annular binding ring, and a safety ring.

6. The apparatus of claim 4 wherein said female die is surrounded by a prestressed wedge-like assembly which comprises a split shim ring in juxtaposition with said female die, the adjacent surface of said split shim ring having a bevel shaped face, said shim ring being circumscribed in succession by an inner annular binding ring, an outer annular binding ring, and a safety ring.

7. The apparatus of claim 4 wherein each of said male rams is circumscribed by a ram support ring, and has as means for transmitting pressure thereto a press platen and a saucer-shaped back-up block between said platen and said ram.

8. An apparatus capable of exerting a pressure of at least 100,000 atmospheres on a test specimen and simultaneously heating it to at least a temperature of 3000° C.; which comprises opposed frustoconical male rams which are free to converge within a compatibly shaped female die thereby forming a cylindrical core region, said male rams being circumscribed by a ram support ring, and has as means for transmitting pressure thereto a press platen and a saucer-shaped back-up block between said platen and said ram.

9. The apparatus of claim 8 wherein said female die is surrounded by a prestressed wedge-like assembly which comprises a bevel shaped annulus in juxtaposition with said female die, said annulus being circumscribed in succession by a split shim ring, an inner annular binding ring, an outer annular binding ring, and a safety ring.

10. The apparatus of claim 8 wherein said female die is surrounded by a prestressed wedge-like assembly which comprises a split shim ring in juxtaposition with said female die, the adjacent surface of said split shim ring having a bevel shaped face, said shim ring being circumscribed in succession by an inner annular binding ring, an outer annular binding ring, and a safety ring.

11. The apparatus of claim 8 wherein a replaceable steel decompression cap is disposed between each of said rams and said test specimen.

12. The apparatus of claim 11 wherein said female die is surrounded by a prestressed wedge-like assembly which comprises a bevel shaped annulus in juxtaposition with said female die, said annulus being circumscribed in succession by a split shim ring, an inner annular binding ring, an outer annular binding ring, and a safety ring.

13. The apparatus of claim 11 wherein said female die is surrounded by a prestressed wedge-like assembly which comprises a split shim ring in juxtaposition with said female die, the adjacent surface of said split shim ring having a bevel shaped face, said shim ring being circumscribed in succession by an inner annular binding ring, an outer annular binding ring, and a safety ring.

14. The apparatus of claim 8 wherein consolidation gaskets of yieldable plastic material chosen from the group consisting of extrudable polyethylene and a tetrafluoroethylene polymer are disposed between the mating surfaces of said rams.

15. The apparatus of claim 14 wherein said female die is surrounded by a prestressed wedge-like assembly which comprises a bevel shaped annulus in juxtaposition with said female die, said annulus being circumscribed in succession by a split shim ring, an inner annular binding ring, an outer annular binding ring, and a safety ring.

16. The apparatus of claim 14 wherein said female die is surrounded by a prestressed wedge-like assembly which comprises a split shim ring in juxtaposition with said female die, the adjacent surface of said split shim ring having a bevel shaped face, said shim ring being circumscribed in succession by an inner annular binding ring, and a safety ring.

17. An apparatus capable of exerting a pressure of at least 100,000 atmospheres on a test specimen and simultaneously heating it to at least a temperature of 3000° C.; said apparatus comprising opposed frustoconical male rams which are free to converge within a compatibly shaped female die thereby forming a cylindrical core region, said core region comprising a replaceable steel decompression cap disposed between each of said rams and said test specimen, the conical surfaces of said opposing male rams and said female die being separated by consolidation gaskets of yieldable plastic material chosen from the group consisting of extrudable polyethylene and a tetrafluoroethylene polymer, said male rams being circumscribed by a ram support ring, and has means for transmitting pressure thereto a press platen and a saucer-shaped back-up block between said platen and said ram.

18. The apparatus of claim 17 wherein said female die is surrounded by a prestressed wedge-like assembly which comprises a bevel shaped annulus in juxtaposition with said female die, said annulus being circumscribed in succession by a split shim ring, an inner annular binding ring, an outer annular binding ring, and a safety ring.

19. The apparatus of claim 17 wherein said female die is surrounded by a prestressed wedge-like assembly which comprises a split shim ring in juxtaposition with said female die, the adjacent surface of said split shim ring having a bevel shaped face, said shim ring being circumscribed in succession by an inner annular binding ring, an outer annular binding ring, and a safety ring.

20. An apparatus capable of exerting a pressure of at least 100,000 atmospheres on a test specimen and simultaneously heating it to at least a temperature of 3000° C.; which comprises frustoconical male rams which are free to converge toward each other thereby forming a core region, said male rams being circumscribed by a ram support ring, and has means for transmitting pressure thereto a press platen and a saucer-shaped back-up block between said platen and said ram.

References Cited in the file of this patent

UNITED STATES PATENTS

| | | |
|---|---|---|
| 2,876,072 | Coes | Mar. 3, 1959 |
| 2,941,241 | Strong | June 21, 1960 |
| 2,941,243 | Bundy | June 21, 1960 |
| 2,941,248 | Hall | June 21, 1960 |
| 2,995,776 | Giardini et al. | Aug. 15, 1961 |
| 3,067,465 | Giardini et al. | Dec. 11, 1962 |

FOREIGN PATENTS

| | | |
|---|---|---|
| 845,247 | Great Britain | Aug. 17, 1960 |